United States Patent
King, Jr.

[11] 3,943,748
[45] Mar. 16, 1976

[54] COLDWORK SYSTEM WITH DELAY SPLIT SLEEVE

[76] Inventor: John O. King, Jr., 3990 N. Ivy Road, Atlanta, Ga. 30342

[22] Filed: July 17, 1974

[21] Appl. No.: 489,253

Related U.S. Application Data

[63] Continuation-in-part of Ser. No. 324,485, Jan. 17, 1973, Pat. No. 3,835,688, which is a continuation-in-part of Ser. No. 268,478, July 3, 1972, Pat. No. 3,835,615, which is a continuation-in-part of Ser. No. 33,281, April 30, 1970, abandoned, which is a continuation-in-part of Ser. No. 711,368, March 7, 1968, abandoned.

[52] U.S. Cl. ................ 72/393; 29/446; 72/324; 72/370
[51] Int. Cl.² .......................................... B21D 41/02
[58] Field of Search ........ 72/370, 391, 393; 29/446, 29/523, 243.52, 243.5, 522, 505, 282, 427; 85/63, 75, 72, 77, 84, 86; 83/5, 6, 7, 8

[56] References Cited
UNITED STATES PATENTS

| | | | |
|---|---|---|---|
| 2,411,246 | 11/1946 | Clapper | 29/157.4 |
| 2,502,711 | 4/1950 | Evans | 30/92.5 |
| 2,507,201 | 5/1950 | Evans | 30/92.5 |
| 3,566,662 | 3/1971 | Champoux | 29/446 |
| 3,628,246 | 12/1971 | Bronne | 29/427 |

*Primary Examiner*—C. W. Lanham
*Assistant Examiner*—James R. Duzan
*Attorney, Agent, or Firm*—B. J. Powell

[57] ABSTRACT

A method of coldworking a hole through a work piece which includes the steps of placing a seamless tubular member through the hole in the work piece, passing a mandrel through the tubular member so that the tubular member is expanded radially and circumferentially sufficiently to expand the material in the work piece about the hole beyond its elastic limit, and longitudinally fracturing the tubular member after substantially maximum expansion of the tubular member. The application also contemplates a tubular member construction for use in the method and a tool for performing the method.

4 Claims, 12 Drawing Figures

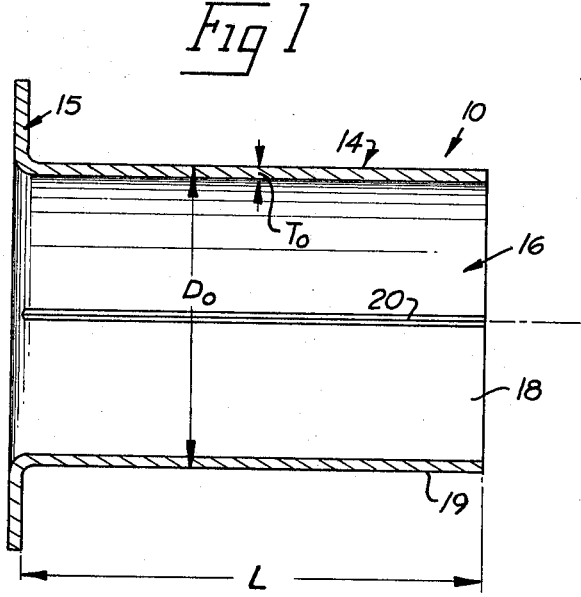
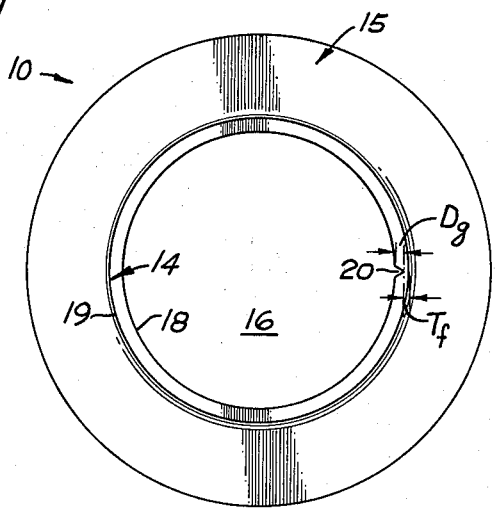
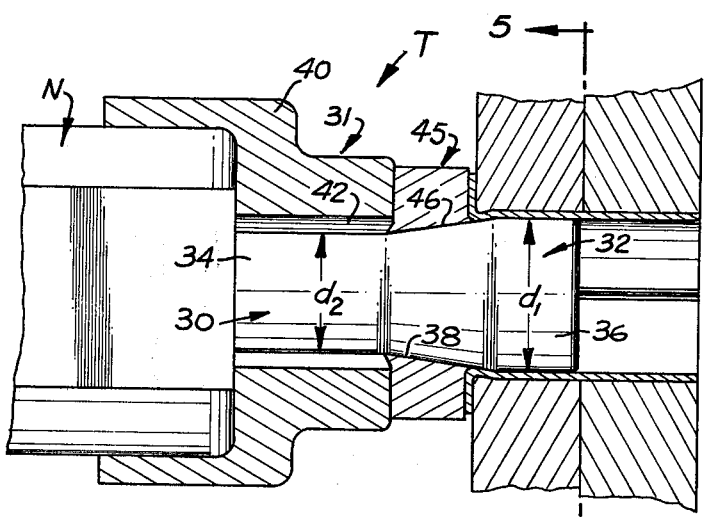
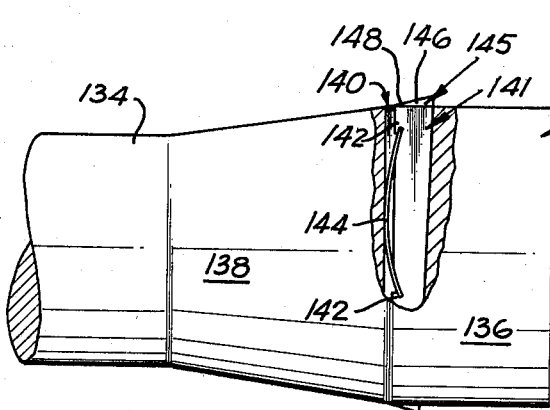
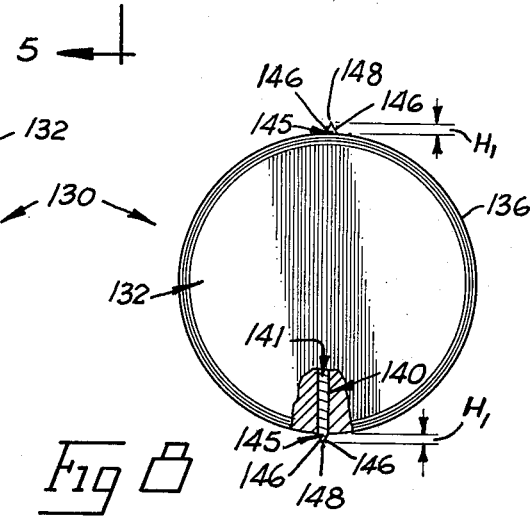

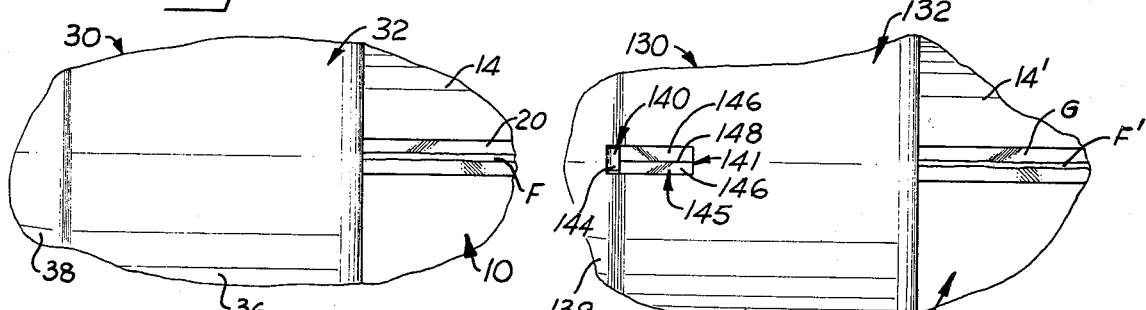
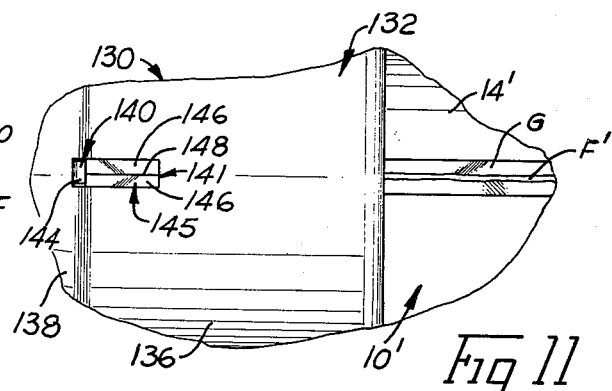
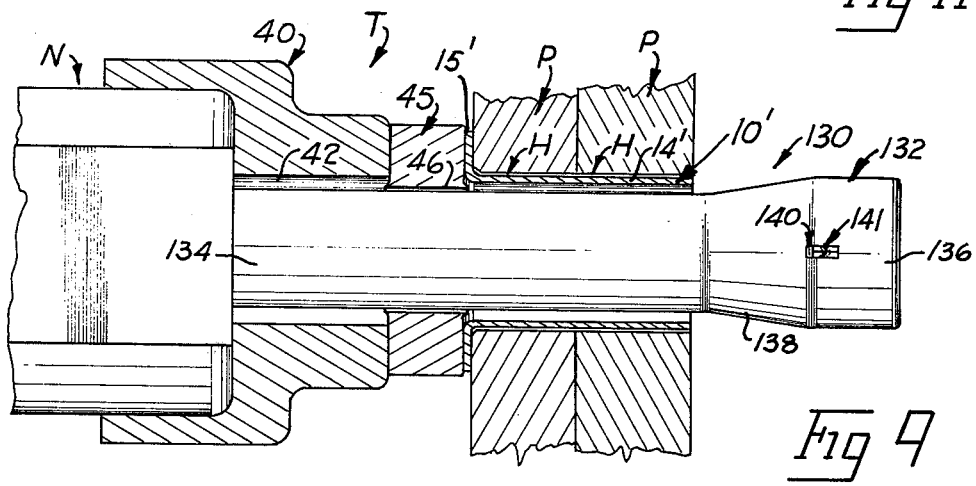
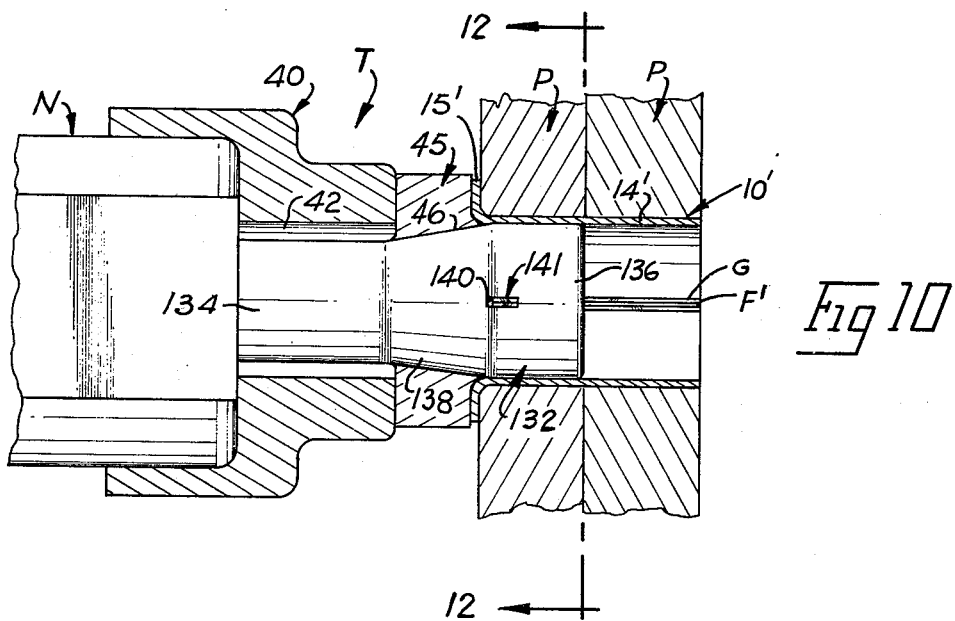

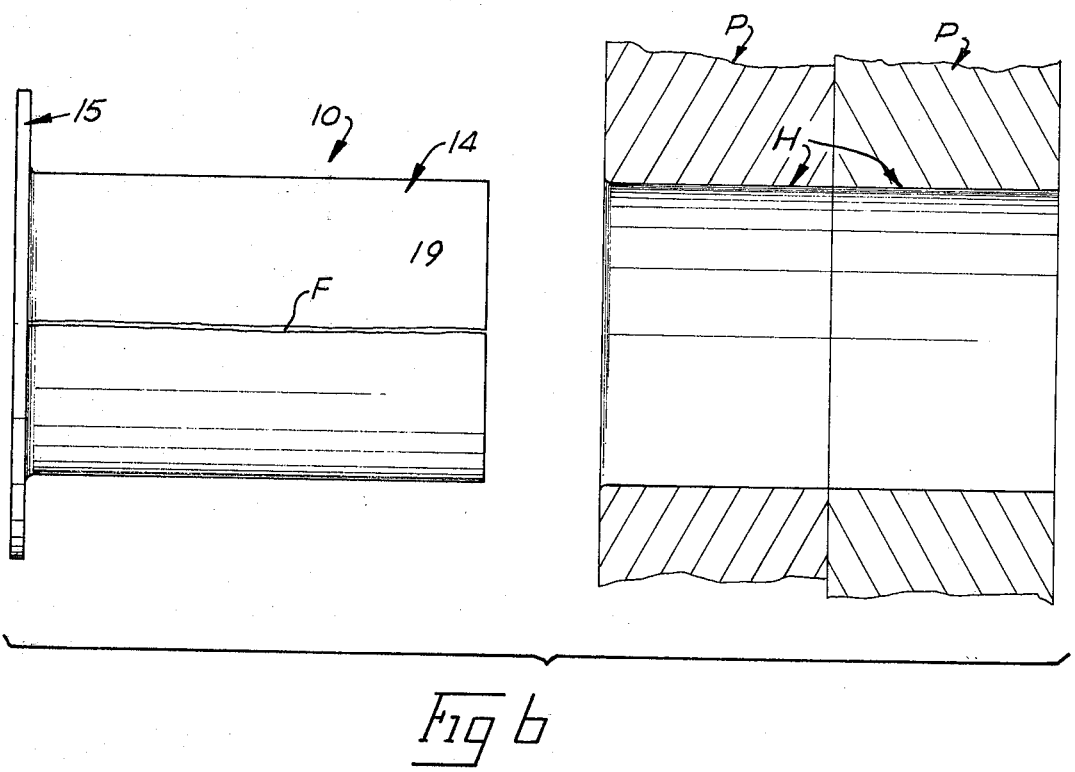
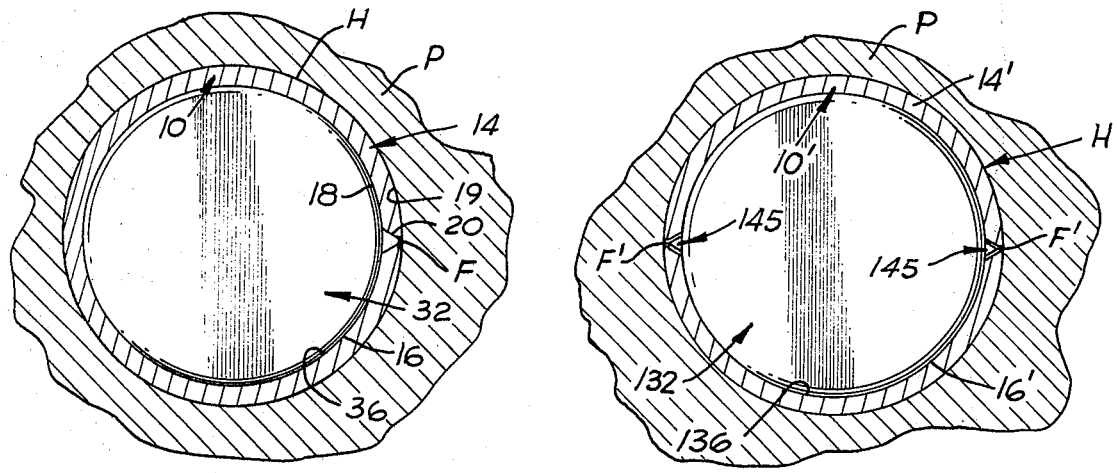

COLDWORK SYSTEM WITH DELAY SPLIT SLEEVE

CROSS-REFERENCE TO RELATED APPLICATIONS

This application is a continuation-in-part of my co-pending application Ser. No. 324,485, filed Jan. 17, 1973, now U.S. Pat. No. 3,835,688 for "Apparatus and Method for Sizing Holes" which is in turn a continuation-in-part of my co-pending application Ser. No. 268,478, filed July 3, 1972, now U.S. Pat. No. 3,835,615 which is in turn a continuation-in-part of my earlier-filed application Ser. No. 33,281,filed Apr. 30, 1970, now abandoned, which was in turn a continuation-in-part of my earlier filed application Ser. No. 711,368 filed Mar. 7, 1968, now abandoned.

BACKGROUND OF THE INVENTION

It is well known that the fatigue life of a stressed work piece with a hole therethrough can be significantly increased by coldworking the hole. Several techniques have been developed to coldwork the hole to increase the fatigue life.

One such technique is disclosed in U.S. Pat. No. 3,566,662 which uses an axial or helical pre-split tubular member through which an expansion mandrel is passed to expand the tubular member radially into the surface of the work piece at the hole and expand the hole beyond its elastic limit. While this technique does offer the advantage of being able to remove the tubular member after the hole has been coldworked, it offers the disadvantage that one area of the hole will be coldworked to a lesser extent where the split in the tubular member is located.

It has subsequently been found, however, that a hole may be coldworked by passing an expansion mandrel through a seamless tubular member. This has the advantage of uniformly coldworking the work piece about the hole but the disadvantage that once the tubular member has been expanded into place, it is locked into the hole of the work piece so that it cannot be easily removed.

SUMMARY OF THE INVENTION

These and other problems and disadvantages associated with the prior art are overcome by the invention disclosed herein in that a technique for coldworking a hole through a work piece is provided which has the desirable characteristics of both the pre-split tubular member coldworking technique and the seamless tubular member coldworking technique. The technique disclosed herein includes expanding a seamless tubular member in the hole so that the material of the work piece about the hole is expanded beyond its elastic limit and longitudinally fracturing the tubular member after the tubular member has reached substantially its maximum expansion so that the tubular member can be removed from the hole after coldworking. Thus, the area of lower expansion using a pre-split tubular member is eliminated yet the tubular member can be easily removed from the hole after the coldworking operation.

One embodiment of the invention uses a seamless tubular member which has at least one longitudinally extending groove along the inside thereof dimensioned so that the tubular member will fracture longitudinally when it has been expanded a predetermined amount. The groove configuration is selected so that the tubular member fractures longitudinally at substantially its point of maximum expansion during the coldworking operation.

Another embodiment of the technique uses an expansion mandrel, which has a fracturing tool built therein, in combination with a seamless tubular member. As the mandrel passes through the tubular member, the tubular member is first expanded to its maximum expansion and then the fracturing member is passed longitudinally therealong to cause the sidewall of the tubular member to fracture longitudinally so that the tubular member can be removed after the coldworking operation.

These and other features and advantages of the invention will be more clearly understood upon consideration of the following detailed description and accompanying specification and drawings wherein like characters of reference designate corresponding parts throughout the several views and in which:

BRIEF DESCRIPTION OF THE DRAWINGS

FIG. 1 is an enlarged longitudinal cross-sectional view of one embodiment of the tubular member of the invention;

FIG. 2 is an end view of the tubular member seen in FIG. 1;

FIG. 3 is a longitudinal cross-sectional view of the tubular member of FIG. 1 being installed;

FIG. 4 is an enlarged view of a portion of FIG. 3;

FIG. 5 is an enlarged partial cross-sectional view taken along line 5—5 in FIG. 3;

FIG. 6 is an enlarged view showing the tubular member after installation and removal;

FIG. 7 is an enlarged view of the operating end of an installation tool for use in a second embodiment of the invention;

FIG. 8 is an end view of FIG. 7;

FIG. 9 is a view showing the installation tool of FIGS. 7 and 8 ready for operation;

FIG. 10 is a view similar to FIG. 9 showing the installation tool coldworking a hole through work pieces;

FIG. 11 is an enlarged portion of FIG. 10; and

FIG. 12 is an enlarged partial cross-sectional view taken along line 12—12 in FIG. 10.

These figures and the following detailed description disclose specific embodiments of the invention, however, it is to be understood that the inventive concept is not limited thereto as it may be embodied in other forms.

DETAILED DESCRIPTION OF ILLUSTRATIVE EMBODIMENTS

Referring to the figures, it will be seen that a first embodiment of the invention is illustrated in FIGS. 1–6 and a second embodiment of the invention is illustrated in FIGS. 7–12. The first embodiment of the invention utilizes a special tubular member which longitudinally fractures upon a prescribed radial expansion thereof and the second embodiment of the invention uses a special mandrel which causes the tubular member to longitudinally fracture as an incident to the coldworking operation.

Referring to FIGS. 1 and 2, it will be seen that a special seamless tubular member 10 through which the holes in the work pieces are to be coldworked is illustrated. The tubular member 10 includes an annular sidewall 14 with a head flange 15 integral with one end thereof. The head flange 15 may be normal to the centerline CL of the tubular member as shown in solid lines in FIG. 1 if the resulting joint is to include an exposed head fastener or may be located at the appropriate angle if the resulting joint is to include a countersunk head fastener. The sidewall 14 defines a passage 16 therethrough about the centerline CL with a substantially constant outside diameter $D_o$ along its length. It is to be further understood that the sidewall 14 may have an inwardly tapering section at that end opposite the head flange 15 for use during insertion of the tubular member 10 into the holes through work pieces to prevent damage thereto. It will further be noted that the thickness $T_o$ of sidewall 14 is substantially constant along its length so as to define concentric inner and outer surfaces 18 and 19 and has a prescribed length L. The thickness $T_o$ and the material of the sidewall 14 are such that the sidewall 14 can be radially and circumferentially expanded to coldwork the material of the work pieces about the hole. One such material that has been found satisfactory is stainless steel when the thickness $T_o$ of the sidewall 14 is approximately 0.008–0.032 inch and where the work pieces are of a material such as an aluminum alloy. It is to be understood that different materials and thicknesses may be used without departing from the scope of the invention.

At least one longitudinally extending V-shaped groove 20 is provided along the length of the inside of sidewall 14 and opens onto the inside surface 18 thereof. The groove 20 extends the full length of the sidewall 14 and serves to reduce the strength of the sidewall 14 therealong. The depth $D_g$ of the groove 20 is selected so that the sidewall 14 will fracture therealong when the sidewall 14 has been radially expanded a prescribed amount. Because the holes through work pieces are generally expanded at least 0.010 inch, the depth $D_g$ is selected so that the sidewall 14 will fracture in the neighborhood of 0.010 inch diametrical expansion of the sidewall 14. One such dimension that has been found satisfactory is when the thickness $T_f$ of the sidewall 14 between the bottom of the groove 20 and the outside surface 19 is approximately 0.004 inch.

The installation of the tubular member 10 is illustrated in FIGS. 3–6. The tubular member 10 is installed using an installation tool T such as that disclosed in my co-pending application Ser. No. 324,485 which includes a mandrel 30 and a driving unit 31 for forcing the mandrel 30 through the tubular member 10. As best seen in FIG. 3, the mandrel 30 includes an expansion section 32 at one end with a support section 34 adapted to be gripped by the driving unit 31 and forced through the tubular member 10. The expansion section 32 defines a major cylindrical surface 36 at its free end with a tapered expansion surface 38 connecting the surface 36 with the support section 34. The diameter $d_1$ of the sizing surface 36 is larger than the inside diameter $D_i$ of the tubular member 10 and the diameter $d_2$ of the support section 34 is smaller than the inside diameter of the passage 16 through the tubular member 10.

The driving unit 31 includes an adapter 40 and a commercially available lock bolt installation tool (not shown) with a self-releasing pulling nose assembly N (partly shown). The support section 34 is gripped in the nose assembly N at the end opposite of the expansion section 32 and the mandrel 30 is pulled toward the nose assembly N. The adapter 40 fits over the end of the nose assembly N and has a passage 42 therein which is aligned with the hole (not shown) in the end of the nose assembly when the adapter is in the position shown in FIG. 3. The passage 42 has a diameter such that the major surface 36 will just slidably pass therethrough to prevent the surface 36 of mandrel 30 from being caught in nose assembly N since this section is normally larger in diameter than the opening in the nose assembly.

A backup member 45 may be used to prevent the end of the tubular member 10 adjacent the head flange 15 from being partially extruded from that side of the work pieces P from which the mandrel 30 exits the tubular member 10. The backup member 45 is more particularly disclosed in my co-pending application Ser. No. 324,485 and has a central aperture 46 therethrough with a diameter at least as small as the inside diameter of the tubular member 10 prior to enlargement and is made of a material which can be radially expanded to allow the expansion section 32 of the mandrel 30 to pass therethrough as disclosed in my co-pending application Ser. No. 324,485.

The tubular member 10 is assembled onto the installation tool T by inserting the support section 34 of the mandrel 30 through the tubular member 10 at that end opposite the head flange 15, inserting the section 34 of the mandrel 30 through the aperture 45 in the backup member 45, and then through the adapter 40 into the nose assembly N. In this condition, the tubular member 10 is inserted through the holes H in the work pieces P with the lock bolt pulling tool so that the head flange 15 bears against one side of the work pieces P. The lock bolt installation tool is then actuated so that the mandrel 30 is pulled toward the nose assembly N to cause the expansion surface 38 to pass into the end of the sidewall 14 of the head flange 15 followed by the major expansion section 36. Just as the juncture between the tapered expansion section 38 and the cylindrical section 36 is reached, the sidewall 14 of the tubular member 10 has been expanded radially and circumferentially sufficiently to cause the sidewall 14 to fail at the section between the bottom of groove 20 and the outside surface 19 of the sidewall 14. Because substantially all of the radial expansion of the sidewall 14 has occurred prior to the fracturing of the sidewall 14 along the groove 20, it will be seen that the work pieces P about the holes H in the vicinity of the groove 20 will also be radially expanded. The fracture F along the groove 20 is best illustrated in FIGS. 4–6. After the passage of the mandrel 30 through the tubular member 10, it will be noted that the sidewall 14 will be longitudinally fractured at F but the head flange 15 will not be. This leaves the fractured portions of the sidewall 14 firmly attached to the head flange 15 to facilitate the removal of the tubular member 10 from the holes H as illustrated in FIG. 6.

SECOND EMBODIMENT OF THE INVENTION

Referring now to FIGS. 7–12, a mandrel 130 is illustrated to be used with a tubular member 10' which is identical in construction to the tubular member 10 except that the groove 20 is not provided. The mandrel 130 is used in the same manner as the mandrel 30 with the tool T to longitudinally fracture the tubular member 10' as will be explained.

Referring to FIGS. 7 and 8, it will be seen that the mandrel 130 includes an expansion section 132 mounted on the end of a support section 134. The expansion section 132 includes a cylindrical major surface 136 which is connected to the support section 134 through a tapered expansion surface 138. The expansion section 132 of the mandrel 130 has the same dimensional diameters $d_1$ and $d_2$ as the mandrel 30. The mandrel 130 also includes a diametrically extending slot 140 through the major cylindrical surface 36 adjacent the leading end thereof. The slot 140 illustrated is generally rectangular in cross-section, however, it is to be understood that different shaped slots 140 may be used without departing from the invention.

A skiving tool 141 is carried in slot 140 and projects from opposite sides of the surface 136. The skiving tool 141 has a generally rectilinear cross-section so that it is slidably received through slot 140 and a pair of detents 142 are provided on one side thereof which receives a biasing leaf spring 144 therein so that when the skiving tool 141 is pushed into the slot 140, the spring 144 bears against the leading edge of slot 140 to retain the skiving tool 141 in position. It will be seen that a cutting projection 145 is provided on opposite ends of the skiving tool 141 which projects out over the surface 136.

The projections 145 each include tapered side edges 146 which join along an outwardly tapering cutting edge 148 that tapers outwardly from the leading edge of tool 141 toward the trailing edge thereof. It will be noted that the height $H_1$ of each of the projections 145 fron the surface 136 is such that a groove G will be cut in diametrically opposite sides of the tubular member 10' as illustrated in FIGS. 10–12. The height $H_1$ is such that the projections 145 cut only partly through the sidewall 14' of the tubular member 10' but the material of the sidewall 14' is reduced sufficiently at the groove G that the sidewall 14' fractures at F' under the stress imposed by the mandrel 130. Because the projections 145 extend from opposite sides of the surface 136 and because the cutting edges 148 thereon taper outwardly toward the trailing end of the tool 141, the tool 141 will be inherently centered as an incident of the mandrel 130 being forced into the tubular member 10' as seen in FIG. 10. It will also be seen that the tool 141 can be easily replaced as it wears.

It will be seen that the tubular member 10' is loaded onto the mandrel 130 in the same manner that the tubular member 10 is loaded onto the mandrel 30. The unit is then placed through the holes H in the work pieces P as seen in FIG. 9 and the installation tool T actuated to pull the mandrel 130 toward the nose assembly N as seen in FIG. 10. AS the expansion surface 138 of the mandrel 130 passes into the tubular member 10', it will be seen that the tubular member 10' is first expanded radially and circumferentially to enlarge the holes H through the work pieces P to coldwork them. As the cylindrical surface 136 passes along the tubular member 10', the groove G will be formed in opposite sides thereof which will cause the tubular member 10' to fracture at F' as seen in FIGS. 10–12. After the tubular member 10' has been coldworked, it can be removed as illustrated in FIG. 6 for the first embodiment of the invention.

It is further to be understood that the concepts disclosed herein may be applied to a tubular member without a head flange thereon to produce the same result. The backup member 45 could be modified to support the end of the headless tubular member as disclosed in my co-pending application Ser. No. 462,817.

While specific embodiments of the invention have been disclosed herein, it is to be understood that full use may be made of modifications, substitutions, and equivalents without departing from the scope of the invention.

I claim:

1. A method of coldworking a hole through a work piece comprising the steps of:
   a. holding the tubular member within the hole through the work piece;
   b. passing a mandrel having an expansion section thereon larger than the initial inside diameter of the tubular member axially through the tubular member while the tubular member is held in the hole to exert outwardly directed forces on the tubular member to radially and circumferentially expand a tubular member so that the material about the hole and the tubular member are expanded beyond their elastic limits; and,
   c. forming a longitudinally extending groove on the inside of the tubular member while the outwardly directed forces are exerted thereon to reduce the strength of the tubular member at the groove sufficiently to cause the tubular member to fracture longitudinally as an incident to the expansion of the tubular member.

2. The method of claim 1 wherein the groove is formed after the tubular member has been expanded beyond its elastic limit.

3. Apparatus for coldworking a hole through a work piece by expansion of a tubular member within the hole through the work piece including:
   a mandrel defining an expansion section thereon adapted for axial movement through the tubular member in circumferentially and radially expand same, said mandrel defining a diametrically extending passage therethrough oriented generally normal to the central axis of said mandrel and opening onto said expansion section at opposite ends thereof; and,
   a skiving tool slidably received in said passage and defining a cutting edge on opposite ends thereof, said skiving tool having a length greater than the diameter of said expansion section at said passage, and less than the sum of the diameter of said expansion section at said passage and two times the wall thickness of the tubular member so that said skiving tool longitudinally and internally grooves the tubular member at diametrically opposite positions to cause the tubular member to fracture along the opposite grooves as an incidence to a prescribed expansion of the tubular member by said mandrel.

4. The apparatus of claim 3 wherein said passage and said skiving member have complimentary non-circular cross-sectional shapes and further including a resilient member resiliently retaining said skiving member within said passage while allowing relative movement of said skiving member within said passage to permit said skiving tool to center itself within said tubular member.

* * * * *